United States Patent [19]

Dusserre-Telmon et al.

[11] Patent Number: 5,445,394
[45] Date of Patent: Aug. 29, 1995

[54] SEALING MEANS BETWEEN A PRESSURIZED CHAMBER AND A LUBRICATED CHAMBER

[75] Inventors: Guy F. P. Dusserre-Telmon, Sivry-Courtry; Daniel G. Plona, Vulaines sur Seine, both of France

[73] Assignee: Societe Nationale d'Etude et de Construction de Moteurs D'Aviation (SNECMA), Paris, France

[21] Appl. No.: 24,775

[22] Filed: Mar. 2, 1993

[30] Foreign Application Priority Data

Mar. 4, 1992 [FR] France ............... 92 02578

[51] Int. Cl.⁶ ............................................ F16J 9/24
[52] U.S. Cl. ...................... 277/173; 277/53; 277/134
[58] Field of Search ............ 277/173, 174, 175, 176, 277/27, 188 R, 53, 48, 29, 134

[56] References Cited

U.S. PATENT DOCUMENTS

| | | | |
|---|---|---|---|
| 3,021,147 | 2/1962 | Haas et al. | 277/174 |
| 3,600,048 | 8/1971 | Makhobey. | |
| 4,406,460 | 9/1983 | Slayton. | |
| 4,426,090 | 1/1984 | Bender. | |
| 4,722,663 | 2/1988 | Swearingen | 277/173 |
| 5,039,115 | 8/1991 | Hebert et al. | 277/175 |
| 5,169,159 | 12/1992 | Pope et al. | 277/53 |

FOREIGN PATENT DOCUMENTS

| | | |
|---|---|---|
| 0387122 | 9/1990 | European Pat. Off. . |
| 1112626 | 3/1956 | France . |
| 0137547 | 10/1979 | Japan ............ 277/175 |
| 0527443 | 12/1989 | U.S.S.R. ......... 277/175 |

*Primary Examiner*—Daniel G. DePumpo
*Attorney, Agent, or Firm*—Oblon, Spivak, McClelland, Maier & Neustadt

[57] ABSTRACT

A seal arrangement located between a lubricated chamber and a pressurized chamber pressurized by a gas at a variable pressure. The seal arrangement includes a seal around a shaft extending into the lubricated and pressurized chambers through a wall separating the chambers. The seal slides along the shaft between a first and a second abutment position via a variable pressure exerting a force on an end face, i.e., a casing, of the seal. The casing, the shaft and seal define a clearance allowing air to pass from the pressurized chamber to the lubricated chamber. Springs urge the seal toward the first abutment position against the variable pressure and have a strength so that, when the variable pressure is under a predetermined value, the clearance is sealed. When the variable pressure is over a predetermined value, the seal slides to the second abutment position and the clearance is opened to allow the pressurized gas to flow from the pressurized chamber to the lubricated chamber.

15 Claims, 3 Drawing Sheets

SEALING MEANS BETWEEN A PRESSURIZED CHAMBER AND A LUBRICATED CHAMBER

BACKGROUND OF THE INVENTION

1. Field of the Invention

The invention relates to a sealing means between a pressurized chamber and a lubricated chamber.

2. Description of the Related Art

Numerous bearings, particularly of aircraft gas turbine engines, have bearings lubricated by a jet or mist of oil and it is necessary to ensure that it is not spread to other parts through the clearance made necessary by the passage of the rotary shafts out of the bearings. For this purpose use is made of various seal types combined with a pressurization of the chambers located on the other side of the seal and which must be protected. The pressurized gas is taken from the engine compressor. The inflow of gases entering the lubricated chamber after passing round the seal therefore reinforces the action of the latter. However, the blown gas flow rate is often too low at low engine r.p.m.'s, where the pressurization is low, in order to be effective.

Therefore, the invention aims at obviating this disadvantage and ensuring a satisfactory flow of gases towards the lubricated chamber in all circumstances. The invention achieves this by giving a variable permeability to the seal, i.e. it is fitted with flexibility enabling it to assume two stable positions as a function of the extent of the pressurization and where the sealing controlled by it differs.

European Patent 387,122 of the present Applicant describes a sealing means forced back by a spring towards an invariable abutment position. U.S. Pat. No. 4,426,090 describes a mobile seal so that the waste lubricant can escape to the outside on forcing it back, which opens a pipe. However, neither of these patents describes the lubrication by an oil mist or the like associated with a permanent flow back into the lubricated chamber by a gas intake through the seal means. The seals are fitted without clearance on the rotary shaft, so that they ensure the necessary sealing. Consequently, they are exposed to friction and a greater wear.

SUMMARY OF THE INVENTION

Therefore, in its most general form, the invention relates to a sealing means placed between a pressurized chamber and a lubricated chamber and around a shaft extending in both chambers and through a wall separating the two chambers, a communication clearance between the chambers being located between the wall and the shaft, characterized in that the seal is mounted in a sliding manner on the shaft between two abutment positions, springs being provided for forcing back the seal towards the pressurized chamber in such a way that when the pressurization reaches a given value overcoming the tension of the springs, the seal occupies a first of the abutment positions where it partly obstructs the clearance, a communication clearance remaining between the seal and either the shaft or the wall and the gasket occupies the second of the abutment positions when the pressurization is below the predetermined value, where a larger clearance is left between the chambers. Therefore the gas always has a charge or energy adequate to satisfy the flow back either by its pressure when the first abutment position is occupied, or by its speed and flow rate.

The first abutment position can be defined by a planar or conical abutment face belonging either to the wall or the shaft and against which the gasket abuts.

The springs mainly extend between the seal and the abutment face, but others can also extend between the seal and a ring mounted on the wall or on the shaft and which defines the second abutment position. The seal can comprise either a rigid collar, or a sealing collar mounted in fixed manner on a seal holder sliding on the shaft or on the wall.

BRIEF DESCRIPTION OF THE DRAWINGS

The invention are described in greater detail hereinafter relative to non-limitative embodiments and with reference to the attached drawings, wherein show.

DETAILED DESCRIPTION OF THE PREFERRED EMBODIMENT

Figure 1:
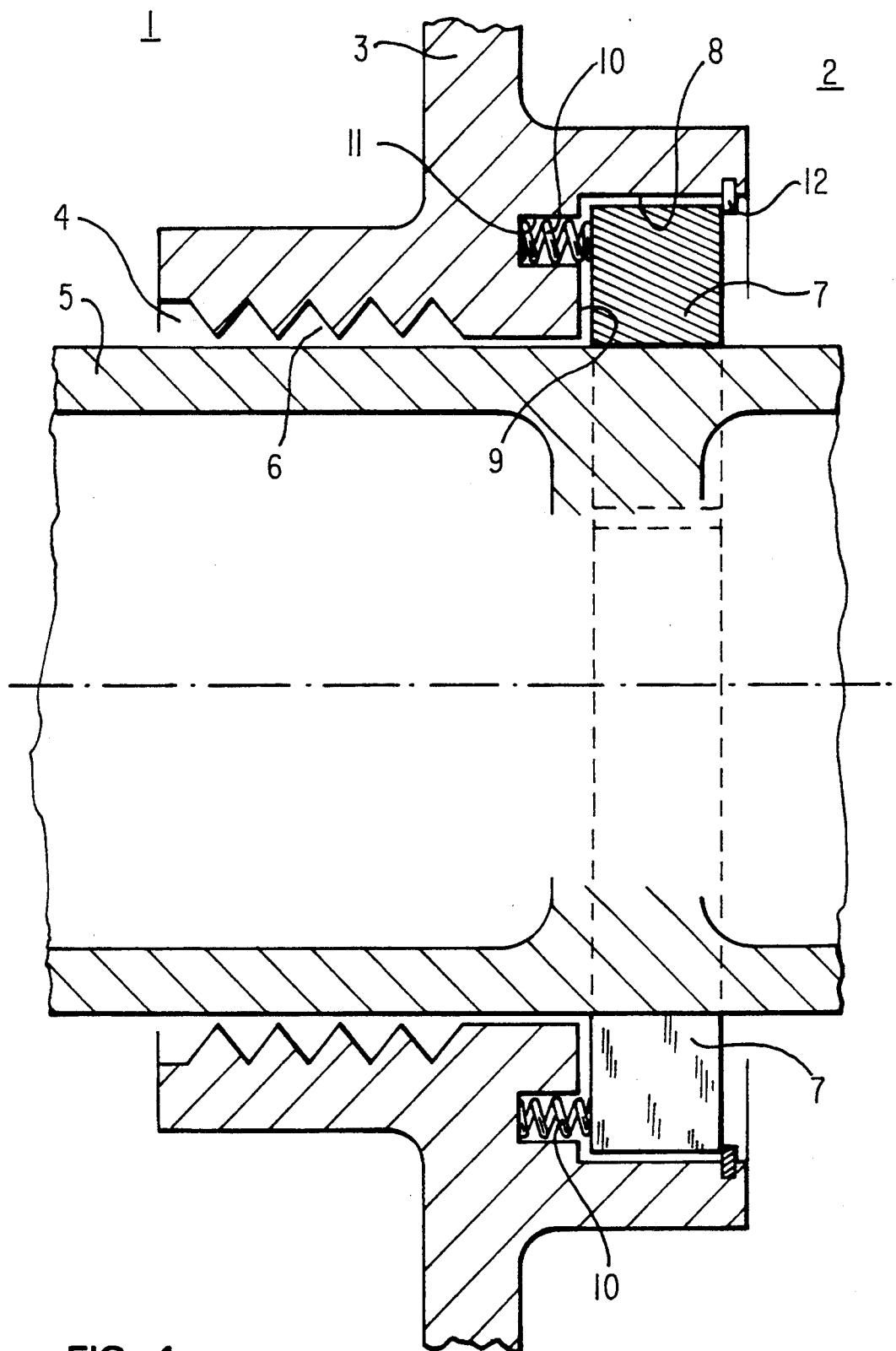
FIGS. 1 and 2 an embodiment of the invention in two operating states.
Figure 2:
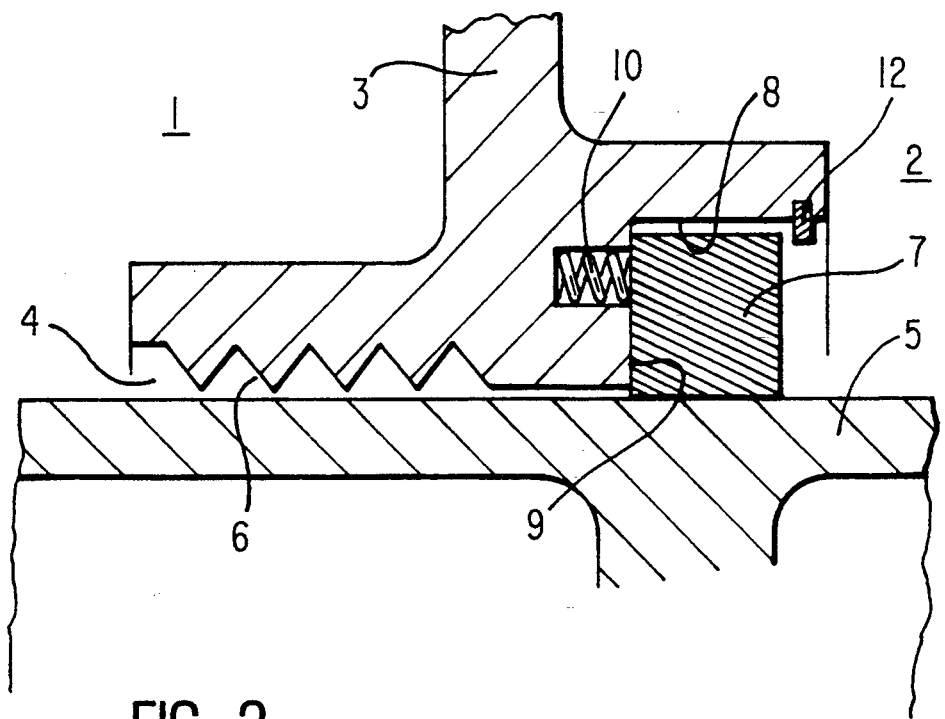

Reference is firstly made to FIGS. 1 and 2, where the lubricated chamber 1 is separated from the pressurized chamber 2 by a wall 3 traversed by a passage 4 for the passage of a shaft 5, which extends into the two volumes 1 and 2, so that the necessary sealing is obtained. Use is jointly made of an oil removing corkscrew part 6 on the circular face of the wall 3 about the shaft 5 and which constitutes a labyrinth seal, as well as a carbon-based, rigid sealing collar 7, which rubs against the shaft 5 with a very limited clearance. There is a larger clearance between the collar 7 and a circular face 8 of the wall 3 in the radial direction and between the collar 7 and a planar face 9 in the axial direction. A spring 10 in a recess 11 formed in the wall 3 and issuing onto the planar face 9 forces back the collar 7 and tends to move it away from the planar face 9 in order to engage it against an elastic ring 12 in the groove of the circular face 8.

There are several similar springs distributed over the periphery of the planar face 9 and the ring 12 is provided with notches (not shown) over part of its width in order to maintain a communication between the pressurized chamber 2 and the clearance between the collar 7 and the circular face 8.

The position shown in FIG. 1 corresponds to a limited pressure in the pressurized chamber 2 at low r.p.m.'s of the engine, which is not sufficient to overcome the stiffness of the spring and the collar 7 abuts against the ring 12. A relatively large clearance links the chambers 1 and 2 between the wall 3 on the one hand and the chamber 5 and collar 7 on the other, against the circular face 8 and the planar face 9. The air of the pressurized chamber 2 can flow at a relatively high speed, despite its low pressure, in order to keep the oil away from the collar 7. When the pressure increases, the collar 7 slides axially on the shaft 5, causing tension in the spring 10 and strikes against the planar face 9. The pressurized air can then pass through the small clearance between the shaft 5 and the collar 7, which takes place at a reduced flow rate, but with an adequate energy to not compromise the oil leak retaining effect. If the collar 7 is formed from arc sectors, the air also passes through the spaces between the sectors.

Figure 3:
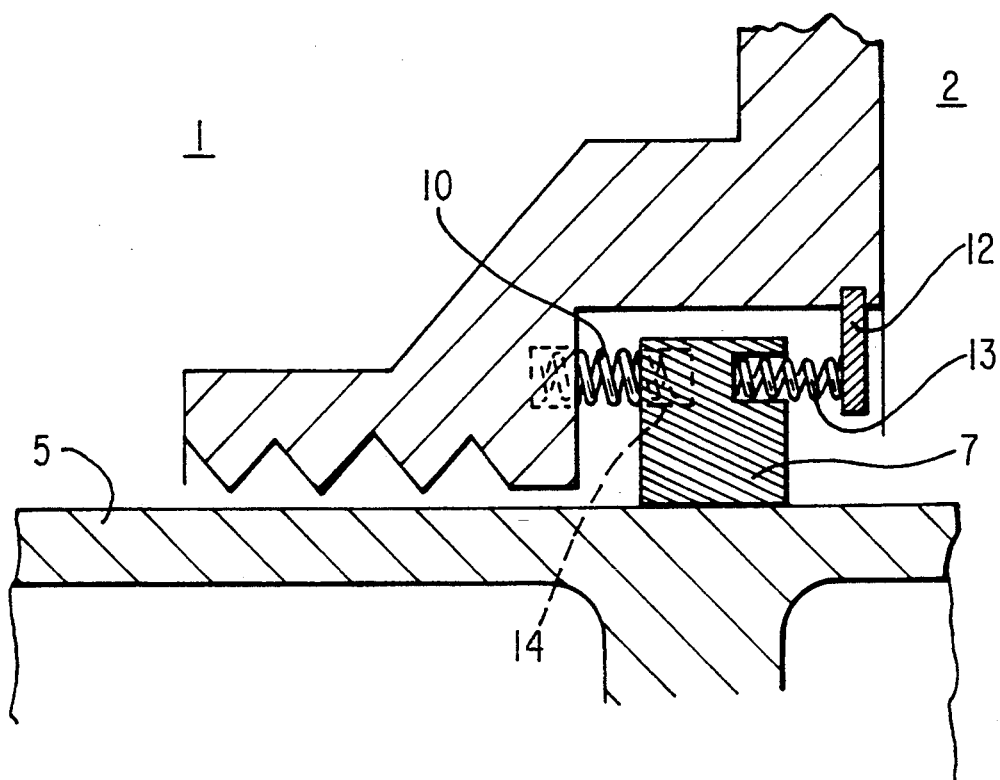
FIG. 3 another embodiment.

The embodiment of FIG. 3 differs from that described hereinbefore in that other springs 13 are provided between the collar 7 and the ring 12 in front of the springs 10. The ring 12 or collar 7 are then given recesses 14 to hold them. The advantage of this embodiment is that it is easier to choose the pressure difference causing the passage of the collar 7 from one abutment position to the other.

Figure 4:
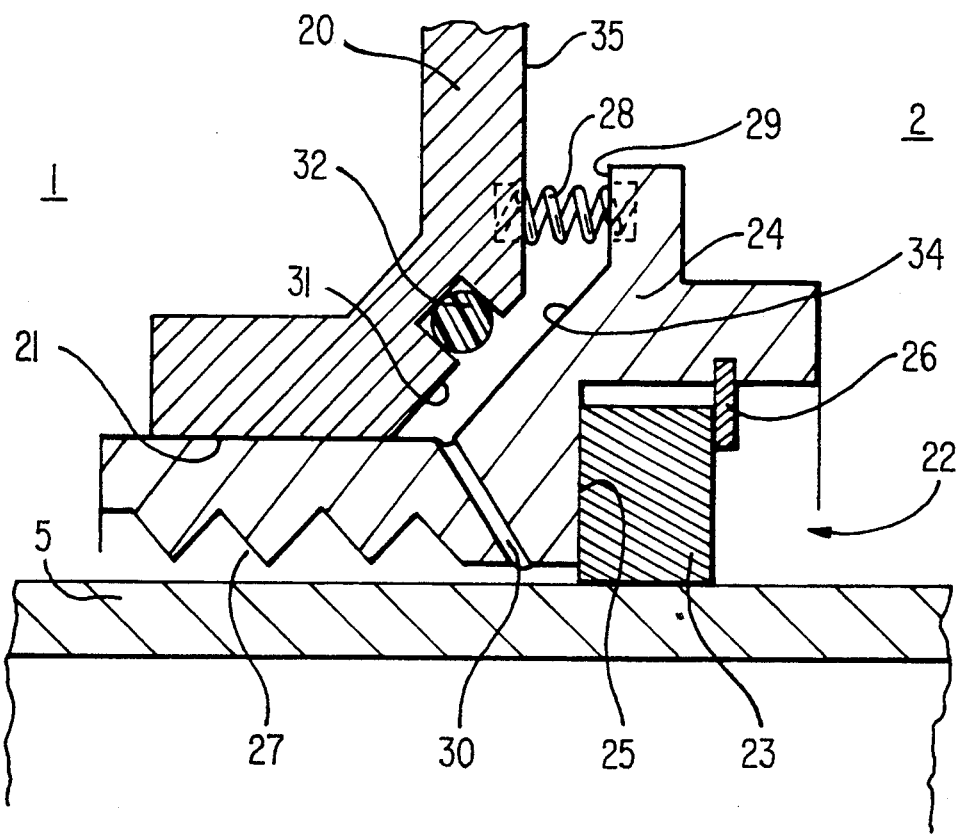
FIG. 4 a third embodiment.

The embodiment of FIG. 4 illustrates a slightly different construction where the separating wall between the two chambers 1 and 2 and designated 20 is provided with a circular face 21 on which slides the seal 22. It is here constituted by a collar 23 forming the actual seal and which rubs with a clearance against the shaft 5 and a seal holder 24 on which the collar 23 is mounted in fixed manner between a planar face 25 thereof and an elastic ring 26. The seal holder 24 carries a corkscrew oil-removing part 27 facing the shaft 5 and alongside the seal 23.

Springs 28 are fitted between a planar face 35 of the wall 20 and the seal 22, but in this case they press on a planar ring 29 of the seal holder 24 and not on the collar 23. Recesses are provided on the wall 20 or the ring 29 for receiving the springs 28.

When the pressure is low in the pressurized chamber 2, the springs 28 are not compressed and there is a relatively large clearance between the seal holder 24 and the wall 20, at least up to the point where it is connected to the circular sliding face 21 by a conical face 31 carrying an O-ring 32. Pipes 30 pass through the seal holder 24 between the aforementioned clearance and that extending between the shaft 5 and the corkscrew part 27 and they issue in front of the conical face 31 and the planar face 35. There is an adequate air flow. When the pressure is higher the springs 28 are compressed and the seal holder 24 moves until the ring 29 and the planar face 35 touch or the conical faces 31 and 34 touch, which render the pipes 30 unnecessary, because the clearance between the wall 20 and the seal holder 24 disappears and the O-ring 32 is pressed against a conical face 34 parallel to the face 31 of the wall 20 of the seal holder 24. Thus, as hereinbefore, the air passes into the lubricated chamber 1 passing between the ring 23 and the shaft 5.

Figure 5:
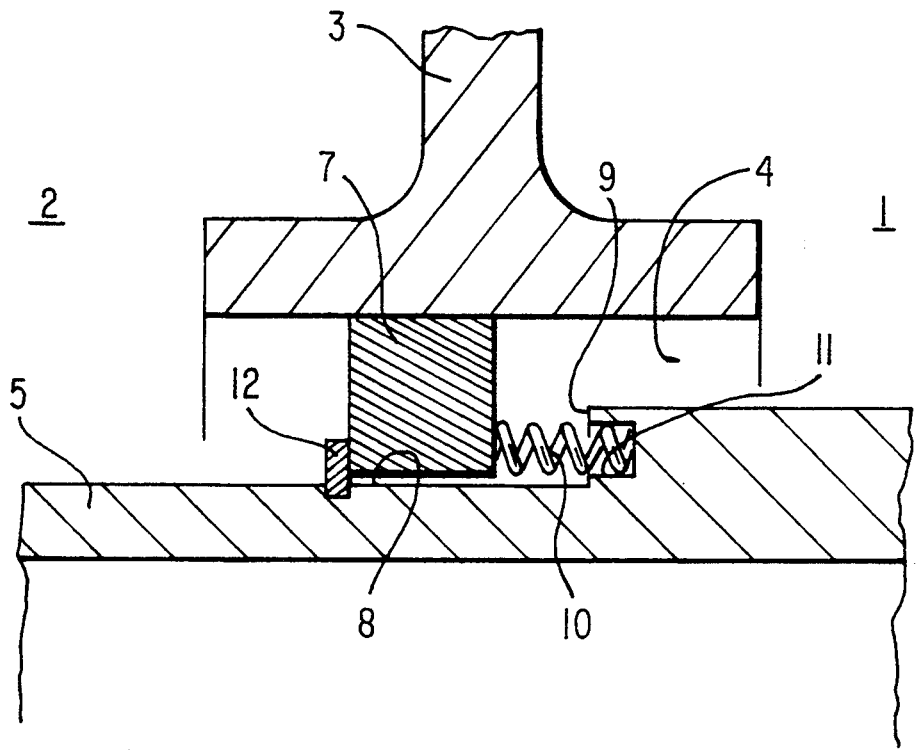
FIG. 5 a fourth embodiment.

The shaft and the wall have functions which can be reversed with respect to the seal or the collar, so that the ring or the planar face define the abutment positions of the seal can be located on the shaft in the manner shown in FIG. 5, where the references of FIGS. 1 and 2 are retained. The circular face 8 spaced by a radial clearance of significant size from the collar 7 then belongs to the shaft 5. The seal holder of FIG. 4 could also slide being guided by the shaft instead of by the circular face 21 and the oil removing corkscrew part could be placed on the shaft. Thus, the collar 7 slides on the passage of the wall 3 with a limited clearance.

Other arrangements are possible without passing outside the scope of the invention. Thus, the per se known oil removing corkscrew part can be omitted.

We claim:

1. Sealing means (7,22) located between a pressurized chamber (2) and a lubricated chamber (1) and around a shaft (5) extending into the pressurized and the lubricated chambers and through a wall (3,20) separating the two chambers, a clearance between the pressurized and the lubricated chambers being provided between the wall and the shaft, characterized in that a seal is fitted so as to slide on the shaft between two abutment positions, springs (10,13,28) being provided for forcing back the seal towards the pressurized chamber in such a way that when pressurization in the pressurized chamber reaches a predetermined value the seal occupies a first abutment position, where it partly obstructs the clearance and that the seal occupies the second abutment position when the pressurization is below the predetermined value creating a larger clearance being left between the pressurized and the lubricated chambers.

2. The sealing means according to claim 1, characterized in that the first abutment position is defined by one of the shapes selected from a group consisting of: a planar (9,35) and conical (31) shaped abutment face against which the seal abuts.

3. The sealing means according to claim 2, characterized in that the springs extend between the seal and the abutment face.

4. The sealing means according to claim 1, characterized in that the second abutment position is defined by a ring (12,16).

5. The sealing means according to claim 4, characterized in that certain of the springs (13) extend between the seal (7) and the ring (12).

6. The sealing means according to claim 1, characterized in that the seal comprises a rigid collar (7).

7. The sealing means according to claim 2, characterized in that the seal comprises a sealing collar (23) fixed to a seal holder (24).

8. The sealing means according to claim 7, characterized in that the seal holder (24) has pipes (30) traversing it and which issue by one end in front of the abutment face.

9. The sealing means according to claim 1, further comprising: an oil removing corkscrew part (6,27) for providing a labyrinth seal between the lubricated and the pressurized chambers.

10. A sealing means separating a lubricated chamber and a pressurized chamber, pressurized by a gas at a variable pressure, comprising:
a wall defining the lubricated and pressurized chambers and including a casing;
a seal within the casing and slidably mounted on a shaft extending through said wall and casing and having a first end face exposed to the pressurized chamber and a second end face exposed to the lubricated chamber, said seal slidable from a first abutment position to a second abutment position;
a clearance defined by the casing, the shaft and the seal, for allowing pressurized gas to flow from the pressurized chamber to the lubricated chamber; and
springs engaged between the casing and the seal to urge the seal toward the pressurized chamber, said springs having a predetermined force constant for forcing the seal off the casing into said first abutment position when the pressurized gas is not at a predetermined pressure and allowing the pressurized gas to flow from the pressurized chamber to the lubricated chamber, and said springs being overcome by said predetermined pressure causing the seal to slidably move into said second abutment position in engagement with the casing and preventing pressurized gas from flowing from the pressurized chamber to the lubricated chamber through the clearance.

11. A seal arrangement according to claim 10, wherein the casing is integral with the wall and the seal slides with respect to the casing, the second abutment position being defined by a face of the casing opposite to the second end face of the seal, which is opposed to the first end face on which a force is exerted from the pressurized gas, the clearance extending mainly around the seal and between the second end face of the seal and said face of the casing.

12. A seal arrangement according to claim 11, wherein the second end face of the seal and said face of the casing are planar.

13. A seal arrangement according to claim 11, wherein the springs extend between the second end face of the seal and said face of the casing.

14. The sealing means according to claim 1, wherein the clearance is formed between the seal and the wall.

15. The sealing means according to claim 1, wherein the clearance is formed between the seal and the shaft.

* * * * *